United States Patent
Carsello (10) Patent No.: US 6,370,211 B1
(45) Date of Patent: Apr. 9, 2002

(54) METHOD AND APPARATUS FOR FACILITATING RECEPTION OF A SIGNAL ON ONE OF A PLURALITY OF CONTIGUOUS CHANNELS

(75) Inventor: Stephen Rocco Carsello, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/245,636

(22) Filed: Feb. 5, 1999

(51) Int. Cl.[7] ............................................... H04L 25/08
(52) U.S. Cl. ...................... 375/346; 375/285; 375/319
(58) Field of Search ................................. 375/261, 284, 375/285, 319, 321, 340, 344, 346; 455/296, 302; 329/318, 320

(56) References Cited

U.S. PATENT DOCUMENTS

| | | | |
|---|---|---|---|
| 5,003,621 A | | 3/1991 | Gailus ........................ 455/209 |
| 5,487,186 A | * | 1/1996 | Scarpa ...................... 455/192.2 |
| 5,548,244 A | * | 8/1996 | Clewer ........................ 329/318 |
| 5,646,627 A | * | 7/1997 | Willis et al. ................. 342/189 |
| 5,715,281 A | | 2/1998 | Bly et al. .................... 375/344 |
| 5,787,133 A | * | 7/1998 | Marchetto et al. .......... 375/366 |
| 5,959,699 A | * | 9/1999 | Patel et al. .................. 348/726 |
| 6,009,126 A | * | 12/1999 | Van Bezooijen ............ 375/319 |
| 6,148,047 A | * | 11/2000 | Mohindra .................... 375/346 |
| 6,226,509 B1 | * | 5/2001 | Mole et al. .................. 455/302 |

* cited by examiner

Primary Examiner—Stephen Chin
Assistant Examiner—Chieh M. Fan
(74) Attorney, Agent, or Firm—R. Louis Breeden (57) ABSTRACT

In a zero intermediate frequency (ZIF) receiver (300) a desired signal is detected (902) and downmixed (924) to baseband, off-centered by an amount determined by at least one of (a) whether (906) pilot symbols are present in the desired signal, and (b) signal levels (908) of the desired signal and adjacent channel signals.

18 Claims, 6 Drawing Sheets

METHOD AND APPARATUS FOR FACILITATING RECEPTION OF A SIGNAL ON ONE OF A PLURALITY OF CONTIGUOUS CHANNELS

FIELD OF THE INVENTION

This invention relates in general to wireless communication systems, and more specifically to a method and apparatus in a zero intermediate frequency (ZIF) receiver for facilitating reception of a signal transmitted on one of a plurality of channels that can produce adjacent channel interference.

BACKGROUND OF THE INVENTION

In a zero intermediate frequency (ZIF) receiver, DC offsets can appear at the receiver output, which land in the center of the received band, thus causing interference with the received signal. In some prior-art receivers, notching out the DC with a narrow highpass filter has provided acceptable performance. Unfortunately, this technique cannot be used when the signal contains a substantial amount of spectral energy at DC, such as is the case for a pilot symbol assisted quadrature amplitude modulated (PSA-QAM) signal. A known method of combating the DC offset problem is to mix the signal off center by one-half the channel spacing, so the DC notch appears between two channels. This, however, can cause problems when a strong interferer is present on an adjacent channel, due to imaging as a result of I/Q imbalance.

What is needed is a solution that can simultaneously solve the DC offset problem associated with zero-centered reception, and the adjacent channel interference problem caused by I/Q imbalance in a non-zero-centered system.

SUMMARY OF THE INVENTION

An aspect of the present invention is a method in a zero intermediate frequency (ZIF) receiver for facilitating reception of a desired signal transmitted on a desired channel of a plurality of channels that can produce adjacent channel interference. The method comprises the steps of detecting the desired signal; and downmixing the desired signal to baseband, off-centered by an amount, thereby generating a downmixed signal. The amount is determined by at least one of (a) whether pilot symbols are present in the desired signal, and (b) signal levels of the desired signal and adjacent channel signals.

Another aspect of the present invention is an apparatus in a zero intermediate frequency (ZIF) receiver for facilitating reception of a desired signal transmitted on a desired channel of a plurality of channels that can produce adjacent channel interference. The apparatus comprises a receiver front end for detecting the desired signal; and a downmixer for downmixing the desired signal to baseband, off-centered by an amount, thereby generating a downmixed signal. The amount is determined by at least one of (a) whether pilot symbols are present in the desired signal, and (b) signal levels of the desired signal and adjacent channel signals.

Another aspect of the present invention is a subscriber unit for facilitating reception of a desired signal transmitted on a desired channel of a plurality of channels that can produce adjacent channel interference. The subscriber unit comprises a receiver front end for detecting the desired signal, and a processing system coupled to the receiver front end for processing the desired signal and for controlling the subscriber unit. The subscriber unit further comprises a downmixer coupled to the receiver front end and coupled to the processing system for downmixing the desired signal to baseband, off-centered by an amount, thereby generating a downmixed signal. The amount is determined by at least one of (a) whether pilot symbols are present in the desired signal, and (b) signal levels of the desired signal and adjacent channel signals.

DETAILED DESCRIPTION OF THE DRAWINGS

Figure 1:
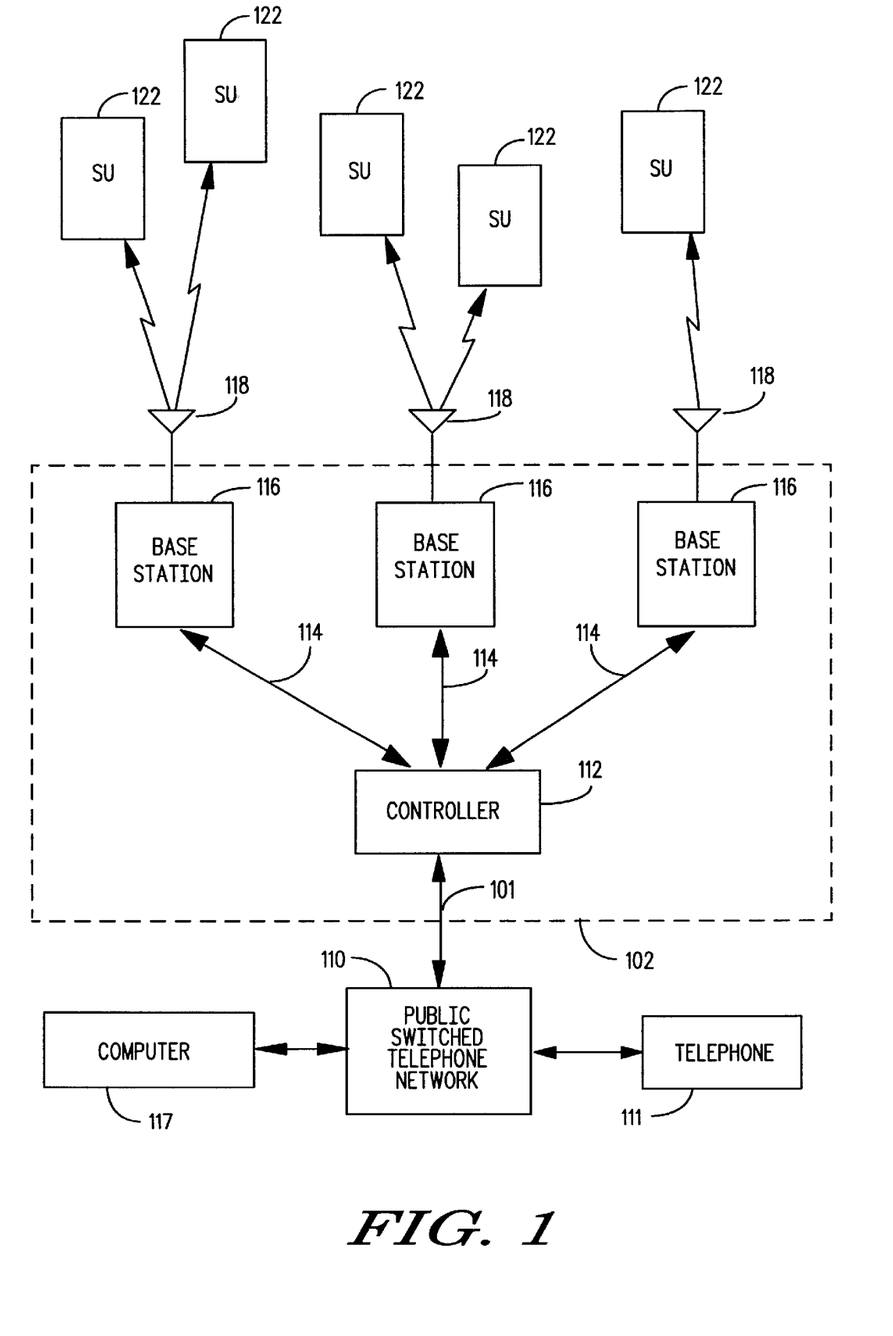
FIG. 1 is an electrical block diagram of an exemplary wireless communication system in accordance with the present invention.

Referring to FIG. 1, an electrical block diagram depicts an exemplary wireless communication system in accordance with the present invention, comprising an infrastructure portion 102 including a controller 112 and a plurality of conventional base stations 116, the communication system also including a plurality of subscriber units 122. The base stations 116 preferably communicate with the subscriber units 122 utilizing conventional radio frequency (RF) techniques, and are coupled by conventional communication links 114 to the controller 112, which controls the base stations 116.

The hardware of the controller 112 is preferably a combination of a Choreographer!® network management device, a Wireless Messaging Gateway (WMG™) Administrator!™ terminal, an RF-Usher!™ multiplexer, and an RF-Conductor!® message distributor manufactured by Motorola, Inc. The hardware of the base stations 116 is preferably an RF-Orchestra!™ transmitter manufactured by Motorola, Inc. The subscriber units 122 are preferably similar to Advisor™ messaging units, also manufactured by Motorola, Inc., and utilize receiver elements and software modified in accordance with the present invention. It will be appreciated that other similar hardware can be used as well for the controller 112, the base stations 116, and the subscriber units 122.

Each of the base stations 116 transmits RF signals to the subscriber units 122 via an antenna 118. In a two-way system, the base stations 116 also receive RF signals from the plurality of subscriber units 122 via the antenna 118. The RF signals transmitted by the base stations 116 to the subscriber units 122 (outbound messages) comprise selective call addresses identifying the subscriber units 122, and data messages originated by a message originator, as well as commands originated by the controller 112 for adjusting operating parameters of the radio communication system. In a two-way system, the RF signals transmitted by the subscriber units 122 to the base stations 116 (inbound messages) can comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the embodiment depicted in FIG. 1 is a one-way wireless communication system, the present invention is equally applicable to a two-way wireless communication system, as well.

Figure 2:
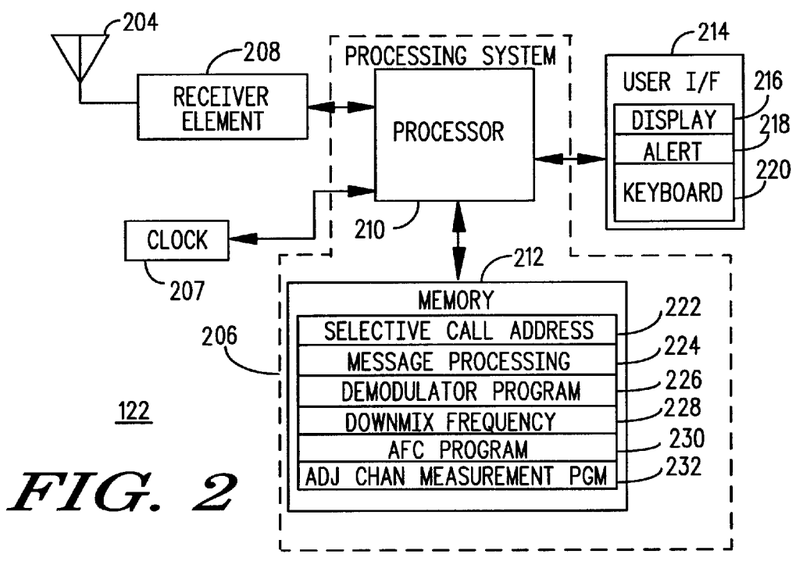
FIG. 2 is an electrical block diagram of an exemplary subscriber unit in accordance with the present invention.

FIG. 2 is an electrical block diagram of an exemplary subscriber unit 122 in accordance with the present invention. The subscriber unit 122 comprises an antenna 204 for intercepting an outbound message. The antenna 204 is preferably coupled to a receiver element 208 for receiving and downmixing a received message. The receiver element 208 is coupled to a processing system 206 for demodulating the message and for controlling the subscriber unit 122 in accordance with the present invention. A user interface 214 preferably is also coupled to the processing system 206 for interfacing with a user. The user interface 214 comprises a conventional display 216 for displaying the message, a conventional alert element 218 for alerting the user when the outbound message arrives, and a conventional keyboard 220 for controlling the subscriber unit 122. A conventional clock 207 is also coupled to the processing system 206 for supporting time keeping requirements of the subscriber unit 122.

The processing system 206 comprises a conventional digital signal processor (DSP) 210 and a conventional memory 212. Preferably, the DSP 210 is from the 56800 family of DSPs manufactured by Motorola, Inc. It will be appreciated that other similar DSPs can be utilized as well for the DSP 210. The memory 212 comprises software elements and data for programming the processing system 206 in accordance with the present invention. The memory 212 preferably includes a selective call address 222 to which the subscriber unit 122 is responsive. In addition, the memory 212 includes a message processing element 224 for programming the processing system 206 to process messages through well-known techniques. The memory 212 further comprises a demodulator program 226 for programming the processing system 206 to demodulate the outbound message signals in accordance with the present invention. The memory 212 also includes a location for storing a downmix frequency 228 used in accordance with the present invention. The memory 212 also includes an automatic frequency control (AFC) program 230 for controlling the downmix frequency in accordance with the present invention. The memory 212 also includes an adjacent channel measurement program 232 for programming the processing system 206 to cooperate with the receiver element to measure signal levels on the adjacent channels in accordance with the present invention. Operation of the subscriber unit 122 in accordance with the present invention will be described in detail further below.

Figure 3:
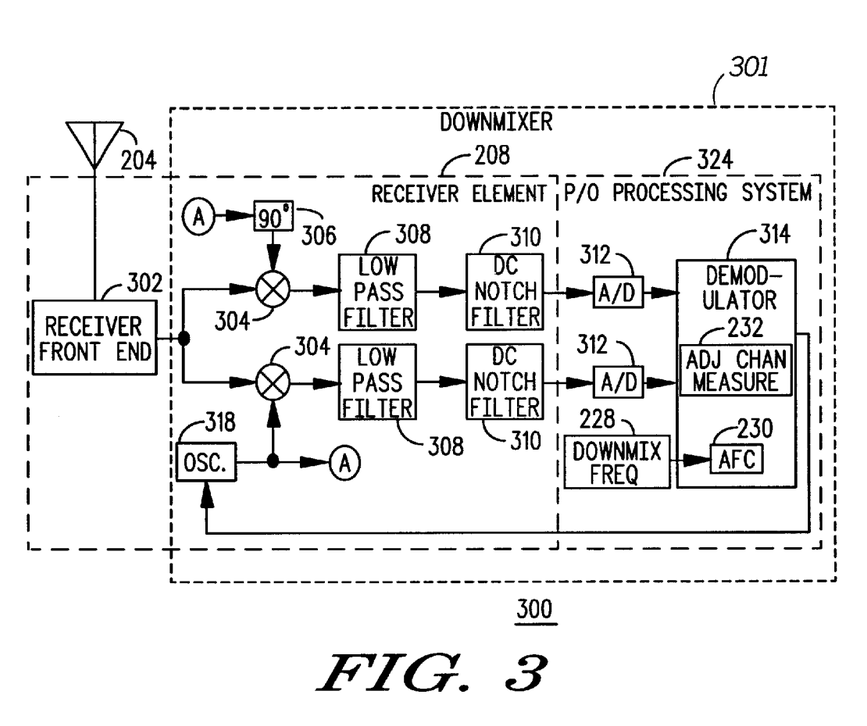
FIG. 3 is an electrical block diagram of an exemplary ZIF receiver in accordance with the present invention.

FIG. 3 is an electrical block diagram of an exemplary ZIF receiver 300 in accordance with the present invention. The ZIF receiver 300 comprises the receiver element 208 and a portion 324 of the processing system 206. The antenna 204 is preferably coupled to a conventional receiver front end 302 for amplifying and downmixing a received signal to form a non-zero intermediate frequency (IF) signal. The receiver front end 302 is coupled to a downmixer 301 comprising the remainder of the receiver element 208 and the portion 324 of the processing system 206, for further downmixing the IF signal in two conventional mixers 304 to generate in-phase and quadrature baseband signals. The baseband signals are filtered in two conventional low pass filters 308 to remove unwanted frequencies, and are then further filtered in two conventional DC notch filters 310 to remove DC distortions that can be present. The baseband signals are then sent to the portion 324 of the processing system 206, where they are digitized in two conventional analog-to-digital (A/D) converters 312. The digitized baseband signals are then demodulated in the demodulator 314, using well-known techniques dependant upon the type of modulation used. The demodulator 314 includes a conventional AFC portion 230 for stabilizing the frequency of a conventional downmix oscillator 318. The AFC portion 316 is controlled by the processing system 206 to adjust the downmix frequency 228 in accordance with the present invention. The downmix oscillator 318 is coupled to one of the mixers 304 through a 90-degree phase shift and to the other mixer 304 with no phase shift, to generate the baseband signals. The adjacent channel measurement program 232 controls channel selection and measures signal levels through well-known techniques.

Figure 4:
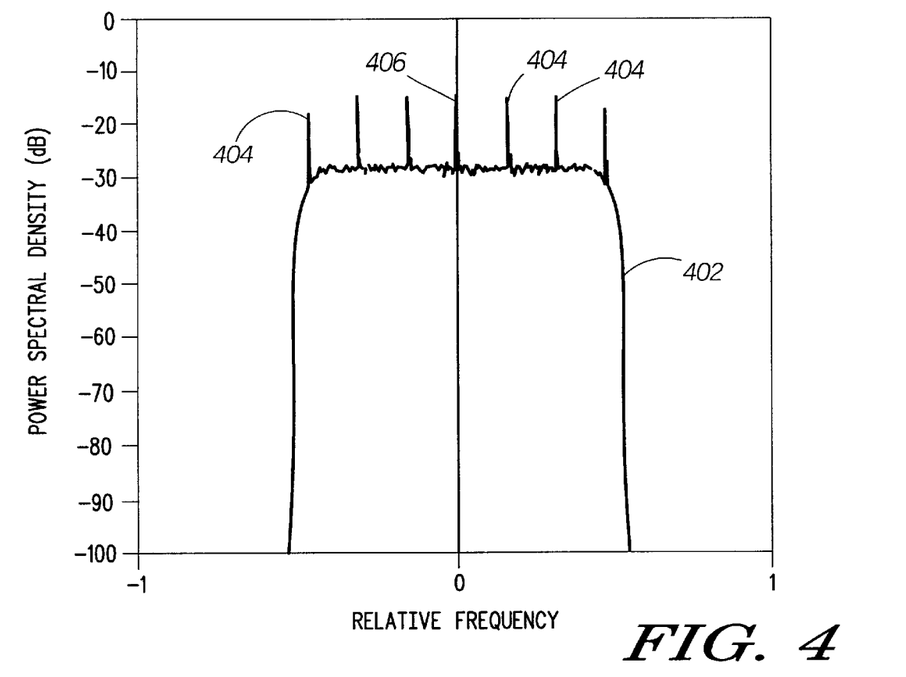
FIG. 4 is a diagram depicting the spectrum of an undistorted PSA-QAM signal.

FIG. 4 is a diagram depicting the spectrum of an exemplary undistorted PSA-QAM signal 402, where pilot symbols are periodically inserted into the data stream at a constant rate, e.g., once every 6 symbols. This type of signaling is referred to as pilot-symbol-assisted QAM, or PSA-QAM. Note the periodicities in the form of harmonics 404 at multiples of the pilot symbol rate. The DC term 406 accounts for approximately 15% of the pilot signal energy, and is a critical element of the PSA-QAM signal. Simulations which notch out this term have shown unacceptable receiver sensitivity, so mixing the PSA-QAM signal down to DC, followed by an AC coupling device is not an acceptable solution when pilot symbols are included in the desired signal.

One solution to the AC coupling problem is to mix the signal off-center by one-half the subchannel spacing. For example, in a system using a subchannel spacing of 4 kHz, mixing the signal down to 2 kHz, as opposed to DC, causes the notch to land in-between the two subchannels, i.e., in the transition band of the QAM signal. The result is that very little degradation in receiver sensitivity is suffered.

However, I/Q imbalance in the ZIF receiver can cause very poor adjacent channel protection. This solution is thus usable only when an adjacent channel signal is not appreciably large, relative to the desired signal.

Figure 5:
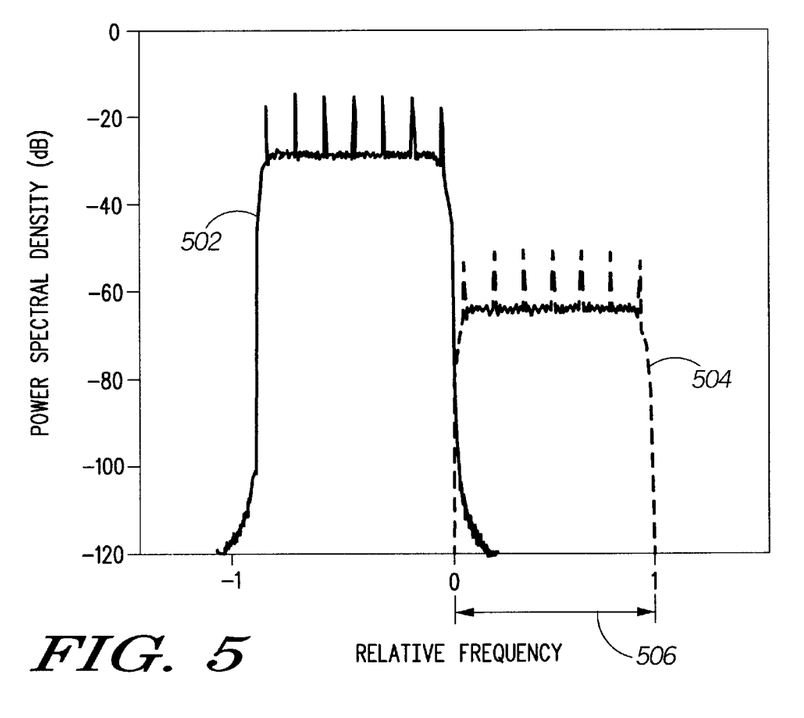
FIG. 5 is a diagram depicting the spectrum of an adjacent channel image which is received offset by one-half the channel spacing.

FIG. 5 is a diagram depicting the spectrum of an adjacent channel image which is received offset by one-half the channel spacing. An adjacent channel signal 502 is depicted on a channel just below the desired channel 506, and its image 504, typically 35 dB down, lands right on top of the desired channel 506. If the C/I requirement out of the receiver selectivity filter is 20 dB, for example, then the adjacent subchannel rejection for this receiver will be no better than 15 dB, due solely to I/Q imbalance. While this solution solves the sensitivity problem, the adjacent channel rejection is very poor. We therefore can use this solution only when the adjacent channel of interest has a signal that is not relatively large, compared with that of the desired channel.

Figure 6:
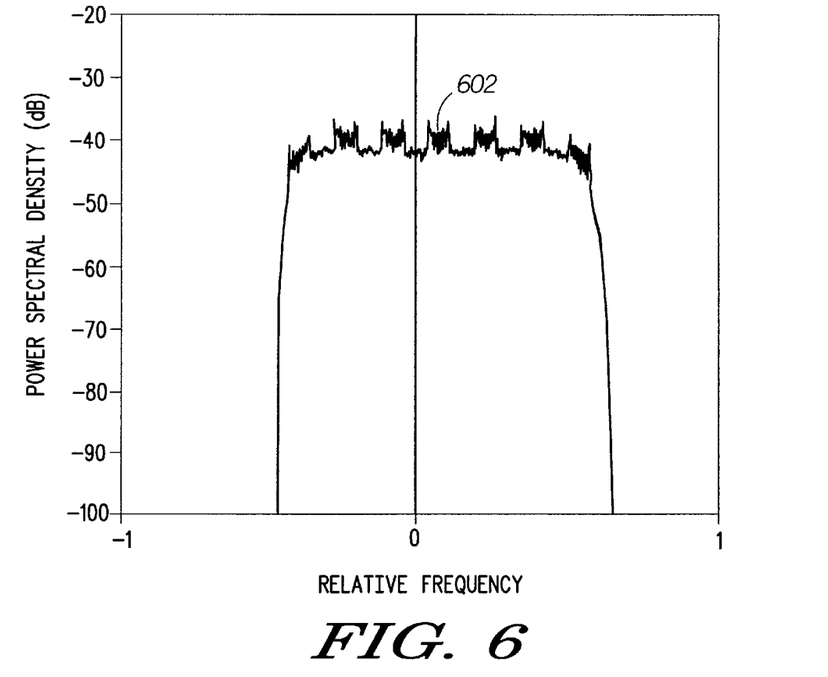
FIG. 6 is a diagram depicting the received spectrum of a PSA-QAM signal at 75 mph in Rayleigh fading with an offset frequency of one-half the pilot symbol rate.

FIG. 6 is a diagram depicting the received spectrum of a PSA-QAM signal at 75 mph in Rayleigh fading (100 Hz Doppler frequency at 935 MHz) with a receiver offset frequency of one-half the pilot symbol rate. Note that the pilot signal harmonics have been spread by the Doppler shifting. Also, note that a DC notch will not affect the pilot signal, which is crucial for achieving good sensitivity. In a practical system, pilot signal energy at odd multiples of one-half the pilot symbol rate is not useable, so notching out this narrow band should not affect the pilot signal, although the data portion of the QAM signal will be affected slightly. It will be appreciated that it is not necessary to adjust the receiver offset frequency to exactly one-half the pilot symbol rate. Tradeoffs can be made between receiver sensitivity and adjacent channel image rejection by moving the offset to a frequency somewhat above or below one-half the pilot symbol rate, as can be seen from FIGS. 7 and 8, described below.

Figure 7:
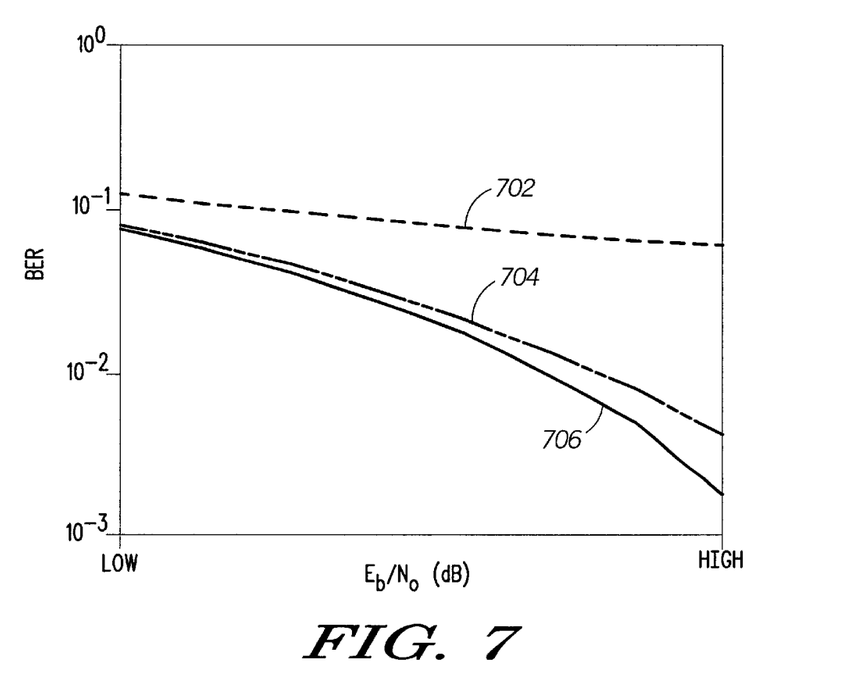
FIG. 7 is a diagram depicting 16-QAM sensitivity with a DC notch bandwidth of +/−5 Hz.

FIG. 7 is a diagram depicting 16-QAM sensitivity with a DC notch bandwidth of +/−5 Hz. Graphs 702, 704, and 706 depict receiver offset frequencies of 0 Hz, one-half the pilot symbol rate, and one-half the channel spacing, respectively. Observe that the DC-centered system (graph 702) performs very poorly, since the DC notch corrupts the pilot signal, while the one-half channel spacing system (graph 706) performs the best, since it corrupts the desired signal the least. An offset frequency of one-half the pilot symbol rate (graph 704) produces about 0.6 dB degradation relative to the ideal case. In the presence of adjacent channel interference, an offset frequency of one-half the channel spacing produces an image caused by I/Q imbalance, and the entire image overlaps the desired band, as illustrated in FIG. 5. For an offset frequency of one-half the pilot symbol rate, only the transition band of this image will overlap on the desired signal, thereby reducing coupled power of the interferer. Thus, for best overall performance, an offset frequency of one-half the channel spacing is desired, when possible. However, when adjacent channel interference prevents using an offset frequency of one-half the channel spacing, an offset frequency of one-half the pilot symbol rate is an excellent alternative.

Figure 8:
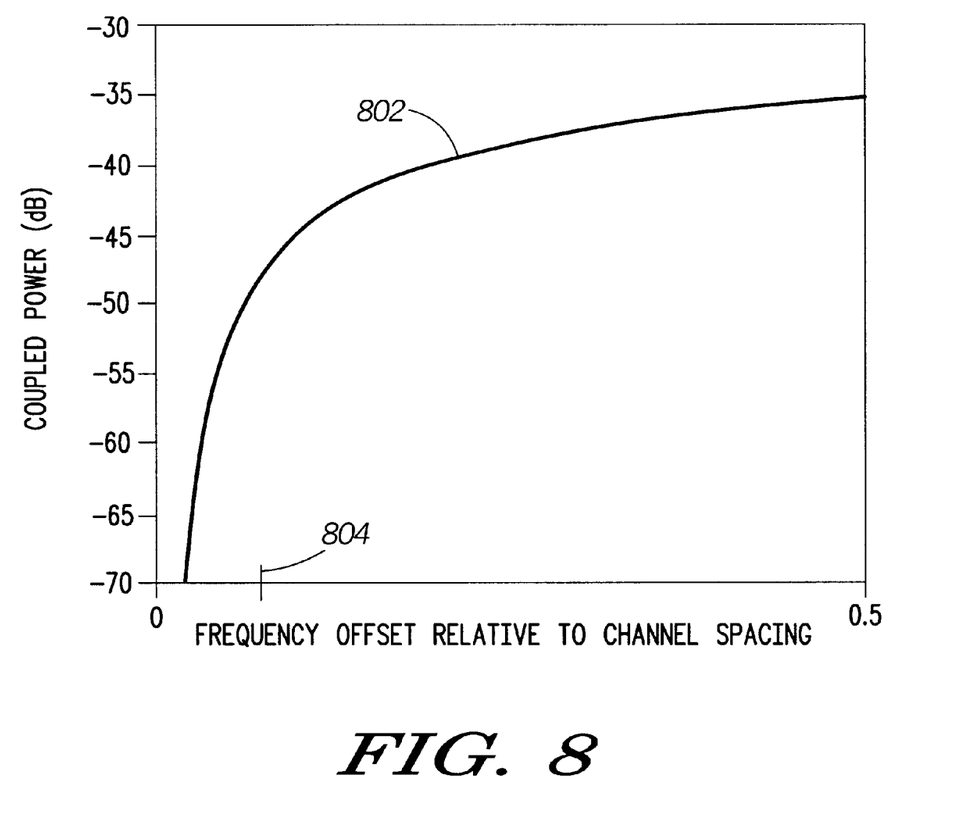
FIG. 8 is a diagram depicting coupled power of an adjacent channel image as a function of receiver frequency offset.

FIG. 8 is a diagram depicting coupled power 802 of an adjacent channel image, caused by I/Q imbalance, as a function of receiver frequency offset. Note that a frequency offset of one-half the channel spacing produces −35 dB coupled power, which is the image rejection of one embodiment of the I/Q demodulator, i.e., all of the image couples into the desired band. A frequency offset of one-half the pilot rate (depicted by the mark 804) achieves an image rejection of 47.7 dB, which corresponds to an adjacent subchannel rejection about 13 dB better than that achieved when the frequency is offset by one-half the channel spacing. Thus, for best overall performance when pilot symbols are present, the preferred embodiment in accordance with the present invention selects a frequency offset of one-half the pilot symbol rate when adjacent channel interference prevents the use of an offset of one-half the channel spacing. Otherwise, the preferred embodiment selects a frequency offset of one-half the channel spacing, for improved sensitivity, when permitted by the absence of adjacent channel interference.

Figure 9:
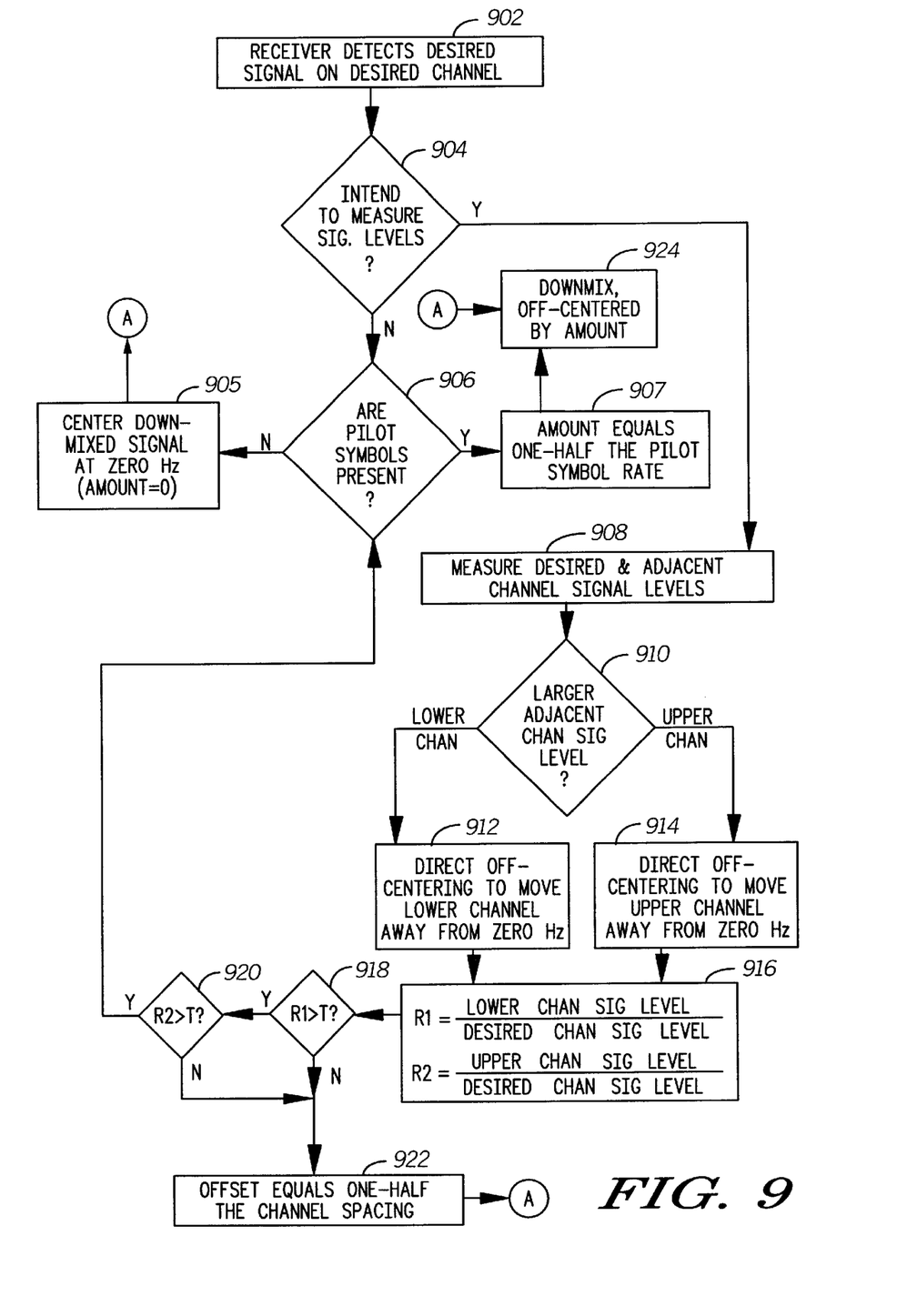
FIG. 9 is a flow diagram depicting operation of the exemplary ZIF receiver in accordance with the present invention.

FIG. 9 is a flow diagram depicting operation of the exemplary ZIF receiver 300 in accordance with the present invention. The flow begins when the ZIF receiver detects 902 the desired signal on the desired channel, using well known techniques, e.g., correct symbol rate, correct synchronization pattern. The receiver 300 then checks 904 whether it is programmed to check signal levels of the adjacent channels for comparison with the desired channel. If not (alternative embodiment), the receiver 300 checks 906 whether pilot symbols inserted at a predetermined rate are present in the received signal. Preferably, the receiver 300 is pre-programmed to expect or not expect pilot symbols, according to the type of system in which the receiver 300 will be used. Alternatively, the receiver can determine this from the received signal itself. As a further alternative, the wireless communication system can inform the receiver about the presence or absence of pilot signals through a conventional block information word.

If at step 906 pilot symbols are present in accordance with the preferred embodiment, the receiver 300 determines 907 the amount of frequency off-centering to be one-half the pilot symbol rate, e.g., 250 Hz if the pilot symbol rate is 500 symbols per second. The frequency off-centering can be either positive or negative in this case, because no measurements have been made about the adjacent channel interference. The receiver 300 then downmixes 924 the signal, off-centered by the amount. If at step 906 pilot symbols are not present (alternative embodiment), the receiver 300 centers 905 the downmixed signal at zero Hz.

On the other hand, if at step 904 the receiver 300 is intended to measure the adjacent channel signal levels, in accordance with the preferred embodiment of the present invention, then the receiver 300 measures 908 the signal levels of the desired channel and of the two adjacent channels. The receiver 300 then compares 910 the signal levels of the adjacent channels to determine which adjacent channel has the larger signal level. If the lower adjacent channel is larger, the receiver 300 directs 912 the off-centering of the downmixed signal in a direction such that the lower channel signal is moved in frequency away from zero Hz. If the upper adjacent channel is larger, the receiver 300 directs 914 the off-centering of the downmixed signal in a direction such that the upper channel signal is moved in frequency away from zero Hz. Moving the larger adjacent channel signal away from zero Hz advantageously minimizes the interfering image signal that results from I/Q imbalance.

The receiver 300 then computes 916 the ratio (R1) of the lower adjacent channel signal level to the desired channel signal level, and the ratio (R2) of the upper channel signal level to the desired channel signal level. In steps 918 and 920 the receiver 300 checks whether either adjacent channel signal level exceeds a predetermined threshold (T). When at least one of the ratios (R1 and R2) does not exceed the threshold (T), the receiver 300 determines 922 the amount of off-centering (in the direction determined by the steps 910 and 912 or 914) to be one-half the channel spacing. Off-centering by one-half the channel spacing advantageously maximizes the receiver sensitivity. The receiver 300 then downmixes 924 the signal, off-centered by the amount determined and in the direction determined.

On the other hand, when both ratios (R1 and R2) exceed the threshold (T), there is too much interference from both adjacent channels to off-center by one-half the channel spacing. Instead, the receiver 300 checks 906 whether pilot symbols are present. If so, the receiver 300 adjusts 907 the off-centering amount to one-half the pilot symbol rate in the direction determined. While not providing quite as high receiver sensitivity as off-centering by one-half the channel spacing, off-centering by one-half the pilot symbol rate advantageously protects the pilot symbols from being affected by the DC notch filters, thereby providing the highest sensitivity obtainable in the presence of high adjacent channel interference. If in step 906 the receiver 300 determines that pilot symbols are not present, then the DC notch filters will have little effect on receiver sensitivity, and the receiver 300 centers 905 the downmixed signal at zero Hz, thereby advantageously maximizing the rejection of the adjacent channel interference.

Thus, it should be clear from the preceding disclosure that the present invention advantageously provides an adaptive method and apparatus in a ZIF receiver that simultaneously solves the DC offset problem associated with zero-centered reception of a signal carrying important DC information, and the adjacent channel interference problem caused by I/Q imbalance in a non-zero-centered system.

Many modifications and variations of the present invention are possible in light of the above teachings. Thus, it is to be understood that, within the scope of the appended claims, the invention can be practiced other than as specifically described herein above.

What is claimed is:

1. A method in a zero intermediate frequency (ZIF) receiver for facilitating reception of a desired signal transmitted on a desired channel of a plurality of channels that can produce adjacent channel interference, the method comprising the steps of:
    detecting the desired signal; and
    downmixing the desired signal to baseband, off-centered by an amount, thereby generating a downmixed signal, wherein the amount is determined by at least one of (a) whether pilot symbols are present in the desired signal, and (b) signal levels of the desired signal and adjacent channel signals.

2. The method of claim 1,
    wherein the desired signal includes the pilot symbols inserted at a predetermined pilot symbol rate, and
    wherein the downmixing step comprises the step of off-centering the downmixed signal by about one-half the pilot symbol rate.

3. The method of claim 1,
    wherein the desired signal includes the pilot symbols inserted at a predetermined pilot symbol rate, and
    wherein the method further comprises the step of measuring a desired signal level on the desired channel and first and second signal levels on first and second adjacent channels, and
    wherein the downmixing step comprises the step of off-centering the downmixed signal by about one-half the pilot symbol rate, when both a ratio of the first signal level to the desired signal level and a ratio of the second signal level to the desired signal level exceed a threshold.

4. The method of claim 1,
    wherein the desired signal does not include the pilot symbols, and
    wherein the method further comprises the step of measuring a desired signal level on the desired channel and first and second signal levels on first and second adjacent channels,
    wherein the downmixing step comprises the step of centering the downmixed signal at zero Hz, when both a ratio of the first signal level to the desired signal level and a ratio of the second signal level to the desired signal level exceed a threshold.

5. The method of claim 1,
    wherein the plurality of channels are separated in frequency by a channel spacing, and
    wherein the method further comprises the step of measuring a desired signal level on the desired channel and first and second signal levels on first and second adjacent channels, and
    wherein the downmixing step comprises the step of off-centering the downmixed signal by one-half the channel spacing, when at least one of a ratio of the first signal level to the desired signal level and a ratio of the second signal level to the desired signal level does not exceed a threshold.

6. The method of claim 1, further comprising the step of measuring signal levels on two channels adjacent to the desired channel to determine which adjacent channel has a higher signal level,
    wherein the downmixing step comprises the step of off-centering the downmixed signal in a direction such that the adjacent channel having the higher signal level is shifted in frequency away from zero Hz.

7. An apparatus in a zero intermediate frequency (ZIF) receiver for facilitating reception of a desired signal transmitted on a desired channel of a plurality of channels that can produce adjacent channel interference, the apparatus comprising:
    means for detecting the desired signal; and
    means for downmixing the desired signal to baseband, off-centered by an amount, thereby generating a downmixed signal, wherein the amount is determined by at least one of (a) whether pilot symbols are present in the desired signal, and (b) signal levels of the desired signal and adjacent channel signals.

8. The apparatus of claim 7,
    wherein the desired signal includes the pilot symbols inserted at a predetermined pilot symbol rate, and
    wherein the apparatus further comprises means for off-centering the downmixed signal by about one-half the pilot symbol rate.

9. The apparatus of claim 7,
    wherein the desired signal includes the pilot symbols inserted at a predetermined pilot symbol rate, and
    wherein the apparatus further comprises:
        means for measuring a desired signal level on the desired channel and first and second signal levels on first and second adjacent channels; and
        means for off-centering the downmixed signal by about one-half the pilot symbol rate, when both a ratio of the first signal level to the desired signal level and a ratio of the second signal level to the desired signal level exceed a threshold.

10. The apparatus of claim 7,
    wherein the desired signal does not include the pilot symbols, and wherein the apparatus further comprises:
  means for measuring a desired signal level on the desired channel and first and second signal levels on first and second adjacent channels; and
  means for centering the downmixed signal at zero Hz, when both a ratio of the first signal level to the desired signal level and a ratio of the second signal level to the desired signal level exceed a threshold.

11. The apparatus of claim 7,
wherein the plurality of channels are separated in frequency by a channel spacing, and
wherein the apparatus further comprises:
  means for measuring a desired signal level on the desired channel and first and second signal levels on first and second adjacent channels; and
  means for off-centering the downmixed signal by one-half the channel spacing, when at least one of a ratio of the first signal level to the desired signal level and a ratio of the second signal level to the desired signal level does not exceed a threshold.

12. The apparatus of claim 7, further comprising:
  means for measuring signal levels on two channels adjacent to the desired channel to determine which adjacent channel has a higher signal level; and
  means for off-centering the downmixed signal in a direction such that the adjacent channel having the higher signal level is shifted in frequency away from zero Hz.

13. A subscriber unit for facilitating reception of a desired signal transmitted on a desired channel of a plurality of channels that can produce adjacent channel interference, the subscriber unit comprising:
  a receiver front end for detecting the desired signal;
  a processing system coupled to the receiver front end for processing the desired signal and for controlling the subscriber unit; and
  a downmixer coupled to the receiver front end and comprising a portion of the processing system for downmixing the desired signal to baseband, off-centered by an amount, thereby generating a downmixed signal, wherein the amount is determined by at least one of (a) whether pilot symbols are present in the desired signal, and (b) signal levels of the desired signal and adjacent channel signals.

14. The subscriber unit of claim 13,
wherein the desired signal includes the pilot symbols inserted at a predetermined pilot symbol rate, and
wherein the processing system is programmed to off-center the downmixed signal by about one-half the pilot symbol rate.

15. The subscriber unit of claim 13,
wherein the desired signal includes the pilot symbols inserted at a predetermined pilot symbol rate, and
wherein the processing system is programmed to:
  cooperate with the receiver front end to measure a desired signal level on the desired channel and first and second signal levels on first and second adjacent channels; and
  off-center the downmixed signal by about one-half the pilot symbol rate, when both a ratio of the first signal level to the desired signal level and a ratio of the second signal level to the desired signal level exceed a threshold.

16. The subscriber unit of claim 13,
wherein the desired signal does not include the pilot symbols, and
wherein the processing system is programmed to:
  cooperate with the receiver front end to measure a desired signal level on the desired channel and first and second signal levels on first and second adjacent channels; and
  center the downmixed signal at zero Hz, when both a ratio of the first signal level to the desired signal level and a ratio of the second signal level to the desired signal level exceed a threshold.

17. The subscriber unit of claim 13,
wherein the plurality of channels are separated in frequency by a channel spacing, and
wherein the processing system is programmed to:
  cooperate with the receiver front end to measure a desired signal level on the desired channel and first and second signal levels on first and second adjacent channels; and
  off-center the downmixed signal by one-half the channel spacing, when at least one of a ratio of the first signal level to the desired signal level and a ratio of the second signal level to the desired signal level does not exceed a threshold.

18. The subscriber unit of claim 13, wherein the processing system is programmed to:
  measure signal levels on two channels adjacent to the desired channel to determine which adjacent channel has a higher signal level; and
  off-center the downmixed signal in a direction such that the adjacent channel having the higher signal level is shifted in frequency away from zero Hz.

* * * * *